United States Patent

Friedline

[15] 3,688,609
[45] Sept. 5, 1972

[54] OVERDRIVE ELECTRONIC CONTROL SYSTEM

[72] Inventor: Kenneth L. Friedline, Muncie, Ind.

[73] Assignee: Borg-Warner Corporation, Chicago, Ill.

[22] Filed: Nov. 12, 1970

[21] Appl. No.: 88,761

[52] U.S. Cl. ..................74/866, 74/336, 74/365
[51] Int. Cl. ............................................B60k 21/00
[58] Field of Search.....................74/866, 336, 365

[56] References Cited

UNITED STATES PATENTS

| | | |
|---|---|---|
| 3,324,740 | 6/1967 | Lewis et al...................74/866 |
| 3,354,744 | 11/1967 | Kuhnle et al. ...............74/645 |
| 3,433,101 | 3/1969 | Scholl et al..................74/866 |
| 3,440,904 | 4/1969 | Kelbel .........................74/866 |

Primary Examiner—C. J. Husar
Attorney—Donald W. Banner, William S. McCurry and John W. Butcher

[57] ABSTRACT

An overdrive control system for a motor vehicle is disclosed in which a speed signal is compared with engine load signals to institute and drop out of overdrive drive ratio at different sensed speeds under different load conditions. Specifically, for example, when low engine load (coasting) conditions exist, the vehicle is kept in overdrive ratio until a low (e.g. 5 mph) vehicle speed.

8 Claims, 2 Drawing Figures

OVERDRIVE ELECTRONIC CONTROL SYSTEM

FIELD OF THE INVENTION

The present invention relates to interrelated motor and transmission control in motor vehicles and more specifically is concerned with a new electronic control system for instituting and dropping out of overdrive ratio on such vehicles.

BACKGROUND OF THE INVENTION

Overdrive is a motor vehicle device most commonly used on passenger cars and usually available as special equipment. It is essentially a special transmission between the conventional transmission (manual or automatic) and the propeller shaft which either drives the propeller shaft at the same speed or at a stepped-up ratio of the transmission output. In some cases the overdrive unit is incorporated within the transmission housing. Overdrives result in greater fuel economy, less engine wear and less engine noise at higher speeds. See, for example, the article at pp. 455–456 of Volume 9 of McGraw-Hill Encyclopedia of Science and Technology for a description of a conventional overdrive and its control system.

The conventional overdrive has operated successfully and well for many years. However, under some circumstances its combined mechanical and electric control system has not performed as well as could be desired. For example, when the vehicle is descending a mild grade, it could advantageously continue in overdrive until it reaches a lower speed than the speed allowed by the conventional control system. Also the momentary interruption of the engine ignition required by the conventional control system to cutout of overdrive is undesirable.

SUMMARY OF THE PRESENT INVENTION

The present invention, in contrast to prior overdrive control systems, provides an electronic system that senses at least vehicle speed and engine mechanical loading, develops electric signals representatively thereof, and employs means responsive to those signals for going out of or preventing the instituting of overdrive when the engine mechanical load exceeds a first high level and for remaining in overdrive for sensed speeds below normal cutout when the engine load is low.

The engine load for internal combustion engines is preferably sensed by means of intake manifold pressure.

In accordance with one feature of the invention the control is overriden by means of kickdown switch or by a manually operated overdrive selector (lockout) switch, and in case of the actuation of either of these while in overdrive, means are provided to delay overdrive cutout until the engine load sensing signal indicates a mechanical load is placed upon the engine.

This later feature is especially useful when the control system is used in conjunction with an overdrive transmission of the type described and claimed in copending U.S. application Ser. No. 61,957, which was filed on Aug. 7, 1970, in the name of Donald W. Kelbel under the title "Transmission" and has now issued, on Jan. 4, 1972, as U.S. Pat. No. 3,631,741. This patent, U.S. Pat. No. 3,631,741 is assigned to the same assignee as is the present application. The below described particular embodiment of this invention, although of more general application, was specifically constructed for operation with that Kelbel overdrive transmission.

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements.

DETAILED DESCRIPTION

Figure 1:
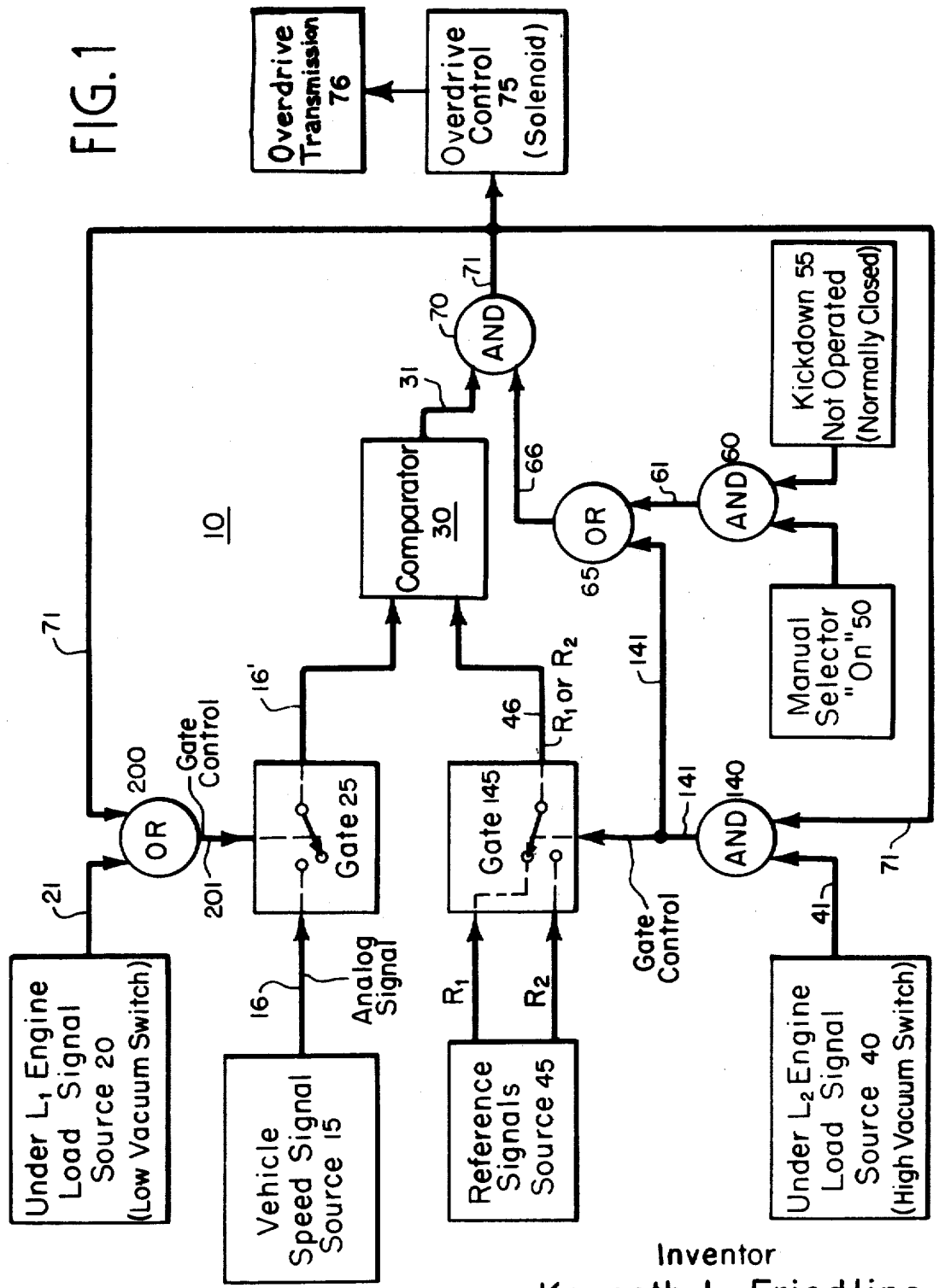
FIG. 1 is a propaedeutical block diagram of an electronic control system constructed in accordance with the present invention.

Referring to FIG. 1 there is depicted an overdrive electronic control system for use in motor vehicles, such as the common passenger car. This system is constructed in accordance with the principles of the present invention and is generally designated by the numeral 10. The system 10 operates to actuate an overdrive control or solenoid 75. The solenoid 75 in turn controls an overdrive transmission 76. The overdrive transmission 76 may be for example of a conventional type such as described in the aforementioned Volume 9 of the McGraw-Hill Encyclopedia of Science and Technology, or may for a further example, be of the type shown in the aforementioned co-pending Kelbel patent.

The system 10 includes a signal source 15 for producing a signal representative of the speed of the vehicle on which the system is installed. This speed analog signal is, as indicated by the lines 16, 16', controllably coupled through a gate 25 to a comparator 30.

The comparator 30 functions to compare the analog signal with one of two reference signals produced by a source 45 and are alternatively and selectively coupled through a gate 145 to the comparator 30. When the speed analog signal reaches a predetermined relationship with whichever reference signal, $R_1$ or $R_2$, is coupled as indicated by the line 46 to the comparator 30, an output signal is produced on output line 31 of the comparator 30.

This output 31 is coupled through an "AND" gate 70 to activate an overdrive control 75, which is preferably a simple solenoid. The "AND" gate 70 has two inputs, the comparator output 31 and an output 66 of an "OR" gate 65. The "AND" gate 70 functions conventionally to produce an output signal on its output line 71 when signals are present on both lines 31 and 66.

The "OR" gate 65 also functions conventionally to produce a signal on line 66 when a signal is present on either of its input lines 141 or 61. The line 61 is the output of a conventional "AND" gate 60 whose two inputs are the outputs of a manual selector 50 and a kickdown switch unit 55. These switch units 50 and 55 are so respectively arranged that an output signal is presented to the "AND" gate 60 when the manual selector has been moved to its "on" position and the kickdown switch 55 has not been activated.

It should be noted that the term kickdown switch as used herein does not encompass just a switch that is activated by the gasoline pedal but includes any equivalent unit used for the purpose of temporarily dropping out of overdrive. In the past, such units have included push button switches mounted on the dash or steering column.

The system 10 also includes a pair of engine load sensing and signaling sources 20 and 40 which together constitute means for sensing and producing a signal representative of engine load conditions. These means are preferably, for the conventional internal combustion engine, intake manifold vacuum switches.

The source 20 produces signals indicative of engine loads above and below a medium load level. The source 20 produces an activating output signal on its output line 21 whenever the load level is under a medium to low level $L_1$, or the intake vacuum exceeds a medium to low level (e.g. 6 inches of mercury). This output signal on 21 is fed to the input of a conventional "OR" gate 200 whose other input is the overdrive command signal of line 71. The output of the "OR" gate 200 is, as indicated by the line 201, used to control the gate 25.

Unless the gate control signal is present on line 201 the speed analog signal on line 16 is not fed to line 16' and thus is not fed to the comparator 30.

The second engine load signal source 40 functions to produce a logical output signal on line 41 for loads under a second engine load level $L_2$ which, is lower than $L_1$. In the preferred case of the source 40 being a vacuum switch, this switch is closed for vacuum of a high level (e.g. 11 inches of mercury).

The output of source 40 is fed over line 41 to an "AND" gate 140, whose other input is the overdrive command signal on line 71 and whose output is the line 141. The line 141, in addition to sensing as an input to the "OR" gate 65 is also the gate control for the gate 145 to alternatively couple the $R_1$ or $R_2$ reference signals to the line 46 and thus to the comparator 30.

FIG. 1 Operation

In overall operation, the system 10 serves to operate the overdrive solenoid control 75 to cause the overdrive transmission 76 to institute and/or drop out of overdrive in response to the vehicle speed signal from the source 15, the engine loading signals from the sources 20 and 40, and the operator selector switches 50 and 55.

Assume the vehicle not being in overdrive initially and the manual selector switch 50 is turned "on", (thus selecting overdrive) and that the kickdown switch is not depressed. Under these common conditions a signal will be present on line 61 and therefor on line 66. This means that the comparator output signal on line 31 will govern the overdrive command output on line 71 and thus the control 75 and the vehicle's entry into overdrive.

As we have assumed the vehicle to be initially not in overdrive, the command signal on line 71 is not present and thus the output 141 of the "AND" gate 140 is absent.

Absent of a signal on line 141 will cause the gate 145 to couple the $R_1$ signal, a high speed analog, signal, to the comparator 30. When the vehicle is accelerating or climbing the engine load will be above $L_1$. In this case the source 20 will put out no command signal on line 21 and as there is no command signal on line 71 the output 201 of the "OR" gate 200 will control the gate 25 to prevent the speed analog signal from being coupled from line 16 to line 16' and thus to the comparator 30.

When the engine load falls below the $L_1$ low level (the vehicle may be cruising or going down hill) the output signal on line 21 changes causing the gate control signal on line 201 to change and couple the speed analog signal to the comparator 30. If this analog signal is in the proper relation to the signal $R_1$ (e.g. over 28 mph), the comparator output on line 31 will change to thus change the output 71 of the "AND" gate 70 and cause the vehicle to go into overdrive.

This output signal on line 71 will also feed back through the "OR" gate 200 to control the gate 25 so as to couple the speed signal from source 15 to the comparator 30. This latching action effectively removes the source 20 from further control of the overdrive solenoid 75 until the vehicle again drops out of overdrive.

The signal on line 71 does not necessarily have any effect on the gate 145 since the "AND" gate 140 requires both that signal 71 and the output 41 from the low load $L_2$ source 40 to be present before producing an output or command signal on line 141. As long as the engine load is above $L_2$, when the sensed vehicle speed falls below the $R_1$ level, the comparator will change its output and cause the vehicle to go out of overdrive.

However, in accordance with a primary feature of the present invention, when the engine is working at a low rate, as when the vehicle is coasting, the output from the low load source 40 serves through the "AND" gate 140 and the gate 145 to connect the low speed (e.g. 5 mph) reference signal $R_2$ to the comparator 30. This allows the vehicle to remain in overdrive at lower speeds than conventionally allowed. This results in greater economy and efficiency of operation of the vehicle.

When this condition occurs, the low load signal source 40 retains control over the overdrive function and, should the engine load increase (as, for example, the vehicle starting up a hill) its output signal would change causing the gate 145 to reconnect the higher speed reference signal (e.g. 28 mph) to the comparator 30 and, if the vehicle speed is below this higher speed, cause the comparator 30 to change its output 31 and cause the vehicle to go out of overdrive.

It should be noted that the low load signal from source 40 through the "AND" gate 140 and the "OR" gate 65 serves to latchably maintain the output of the comparator 30 connected to control line 71 despite the turning off of the manual selector switch 50 or operation of the kickdown switch 55. Thus, if these are operated while the source 40 is indicating a low load condition they will not have effect until the engine load increases beyond the $L_2$ or low level. This prevents damage to the overdrive transmission and other components of the vehicle that might otherwise result from a sudden down shift under these engine load conditions. Under non-low load conditions, (i.e. when the output 41 is absent) these switch units 50, 55 when operated serve to immediately change the command signal on 71 to cause the vehicle to drop out of overdrive.

FIG. 2 Description

Figure 2:
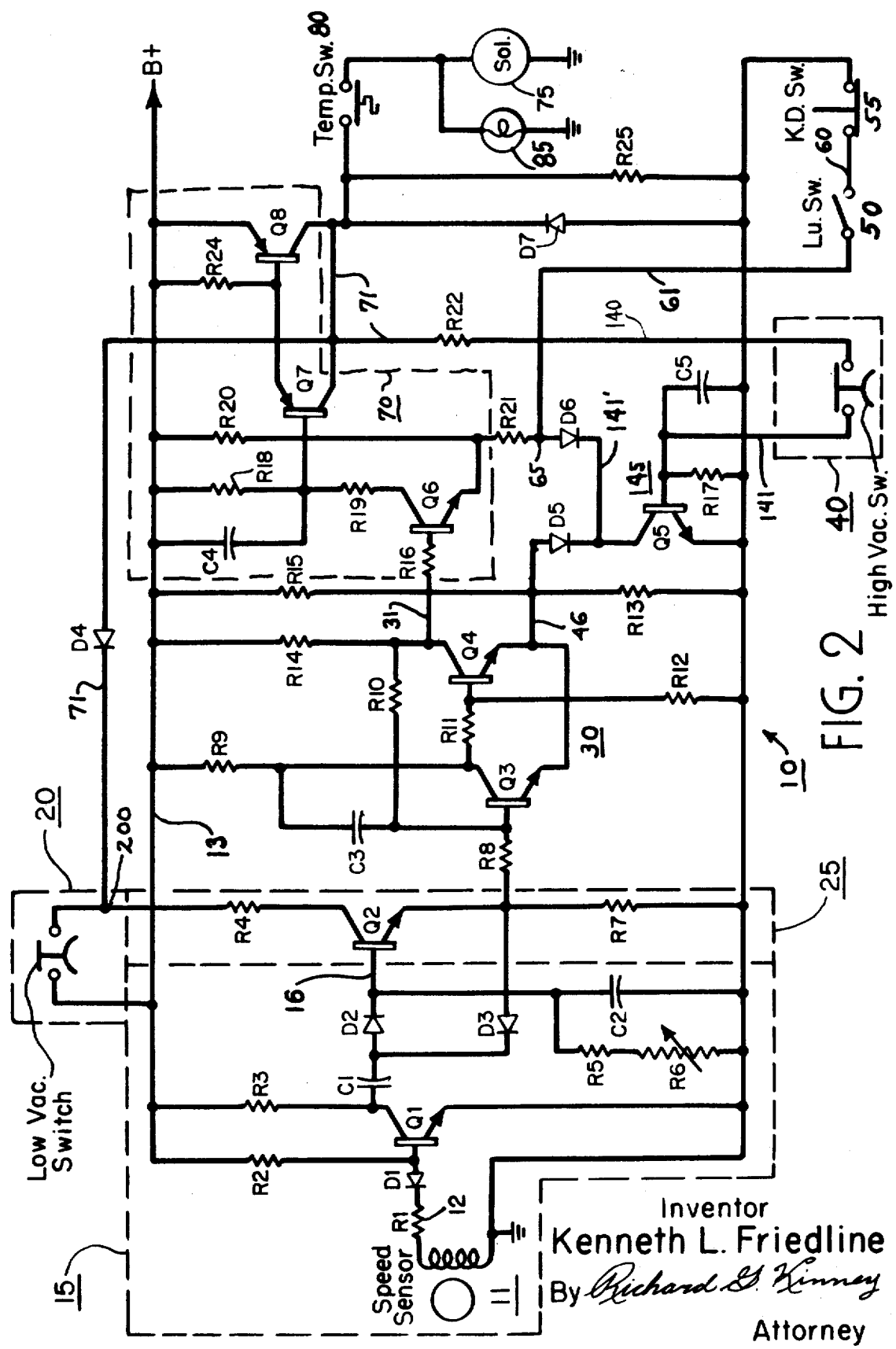
FIG. 2 is a circuit diagram of the system of FIG. 1.

Referring now to FIG. 2, there is depicted a preferred detailed circuit diagram for the system 10 of FIG. 1. This embodiment follows the logical function set out in FIG. 1, although the logical elements are achieved in some cases by the arrangement and interconnection of parts rather than use of specific logic elements.

The speed analog signal source 15 preferably includes a speed sensor, such as an electric a.c. generator 11 one side of which is coupled through a resistor R1 and the cathode to anode circuit of a diode D1 to an a.c. to d.c. converter comprising transistor Q1, respectively connected via resistors R2 and R3 to positive bias line 13 and whole emitter is connected to ground to establish its operating bias. The sine wave produced by the generator 11 is rectified by the diode D1 and connected to the base of the transistor Q1. An essentially square wave output is taken off the collector of the transistor Q1 via a capacitor C1 and impressed onto the junction of a pair of diodes D2, D3. This square wave output is rectified across the anode to cathode circuit of the diode D2 and applied to one side of a second capacitor C2. The other side of the capacitor C2 is grounded. Connected in parallel across the capacitor C2 is the series connection of a pair of resistors R5, R6, with the resistor R6 being preferably variable.

The rectified a.c. signal is integrated in the resistive capacitor time network to produce a d.c. voltage across the capacitor C2 whose level is proportional to vehicle speed. In a particular embodiment that was constructed, this voltage proved to be approximately linearly related to speed within the useful speed range.

The junction between diode D2 and capacitor C2 is connected via the line 16 to the base of a second transistor Q2. The transistor Q2 forms the gate 25 and has its emitter connected through the anode-cathode circuit of the diode D3 to the capacitor C1 and also through a resistor R7 to ground. Its collector connected through a small resistor R4 to the low mechanical engine load signal source 20 which is preferably an intake manifold vacuum switch connected to supply bias potential through the resistor R4 for manifold pressures above a predetermined low level (e.g. 6 inches mercury).

As stated, the output from the speed signal source 15 is a d.c. voltage whose level varies with speed. The output of the gate 25 is likewise a d.c. voltage whose level varies with speed amplified through the transistor Q2. This output is taken from the emitter of the transistor Q2 and coupled through a resistor R8, to the comparator circuit 30.

The comparator 30 is of the flip-flop or bi-stable multivibrator type having two transistors Q3 and Q4 of the NPN type whose emitters are connected in common and whose collectors are respectively connected through resistors R10 and R11 to the base of the other transistor. The base of the transistor Q3 is connected to the resistor R8 and also through a capacitor C3 to its own collector. The collectors of the transistors Q3 and Q4 are respectively connected to the B+ bias line 13 through resistors R9 and R14 and the base of the transistor Q4 is connected to ground through a resistor R12.

The "set" point for the flip-flop made up by the transistors Q3 and Q4 is determined by a normal operation reference voltage established by a voltage dividing circuit made up of the resistors R13 and R15 which are connected in series between the B+ bias line 13 and ground. The reference voltage of the junction of these resistors R13 and R15 are connected to the emitter of the transistors Q3 and Q4.

The output 31 of the comparator 30 is taken from the collector of the transistor Q4 and fed through a resistor R16 to the base of another transistor Q6 of the NPN type. The collector of the transistor Q6 is connected to B+ via the series connected resistors R18 and R19. The junction of these resistors is connected to B+ through a capacitor C4 and is also connected to the base of a PNP transistor Q7. The emitter of the transistor Q6 is connected to the junction of a series connected resistor pair R20, R21. The other end of R20 is connected to B+ while that of R21 is connected through a lock-up or manual selector switch 50 and the kickdown switch 55 to ground. This end of the resistor R21 is also connected through the anode-cathode circuit of a diode D6 to the collector of a NPN transistor Q5. This collector is also connected through the cathode-anode circuit of another diode D5 to the comparator reference voltage establishing junction of R13 and R15. The emitter of the transistor Q5 is at ground potential and its base is connected via the parallel circuit arrangement of a resistor R17 and a capacitor C5 to ground and also through a series connected high vacuum switch 40 and resistor R22 to the collector of the transistor Q7. When the transistor Q7 is conducting, the vacuum switch 40 controls the state of the transistor Q5 to either effectively lower ($r_2$) or now lower ($r_1$) the comparator reference voltage input 46 at the junction of resistors R13 and R15.

The emitter of the transistor Q7 is connected to control a PNP power transistor Q8 whose emitter is connected directly to B+, whose base is connected through a small resistor R24 to B+ and whose collector is connected in common with the collector of the transistor Q7, and also through the cathode-anode circuit of a safety or transient suppressing diode D7 to ground. The collector of the power transistor Q8 is also connected through a resistor R25 to ground and through a temperature switch 80 and through a overdrive actuating solenoid 75 to ground. An indicating lamp 85 is in parallel with the solenoid 75 may be provided for mounting on the control panel or dash of the vehicle.

The switch 80 is responsive to overdrive transmission oil temperature to prevent entering into overdrive when that oil is below a predetermined temperature and is therefore too thick for proper operation.

Operation of FIG. 2

In operation, the speed sensor 11, which may be installed in the speedometer cable of the conventional automobile at some convenient location, generates a small a.c. voltage which has a frequency that is proportional to speed. This signal is fed to the base of the transistor Q1. As this transistor is normally biased to a conducting state by the positive voltage fed to its base through the resistor R2, the negative portions of the a.c. input speed signal from the sensor 11 turns off the transistor Q1 thereby producing a square wave at its collector which is proportional to vehicle speed.

This square wave signal is fed to the rectifying circuit made up of the diodes D2, D3, the capacitor C2 and the transistor Q2 to produce a d.c. voltage at the emitter of the transistor Q2 which d.c. voltage increases as the frequency of the square wave increases. The resistors R5 and R6 control the discharge rate of the capacitor C2 so that a voltage is applied to the comparator 30 which is indicative of the speed of the vehicle. Before this rectifying circuit will function, it must be fed with a voltage B+. This is provided by the low vacuum switch 20 or by the circuit output being fed back via the diode D4. This constitutes the "OR" gate 200.

The output of gate 25 is fed into the comparator 30. This comparator 30 comprises a flip-flop circuit made up of transistors Q3 and Q4, as cited above. The reference signal source 45, made up of a voltage divider comprising the resistors R13 and R15, is fed to the comparator 30. When the signal from the speed sensor 11 becomes larger than that from the reference signal source 45, the comparator 30 turns "on". The comparator 30 feeds the base of transistor Q6 which constitutes the "AND" gate 70 and turns on if both the lock-up switch 50 and the kickdown switch 55 are both closed. The transistor Q6 feeds the transistor Q7 which is a driver for the transistor Q8, which is the switch which energizes the overdrive solenoid 75.

After the solenoid 75 has been energized a feedback is provided to the low vacuum switch 20 through a conventional "OR" gate 200 and the high vacuum switch 40 via the "AND" gate 140. With gate 25 energized via feedback signal to "OR" gate 200 will continue to feed a signal to the comparator 30. The high vacuum switch 40 is now energized via the "AND" switch 145 which is made of transistors Q5 and diode D5. This serves to prevent de-energization of the solenoid 75 under the high-speed-coast load conditions by turning the transistor Q5 "on" when the switch 40 closes. This lowers the signal applied to the emitters of the transistors Q3 and Q4. Thus the signal from the speed sensor will have to drop much lower to cause the comparator 30 to turn off. By lowering the output of the voltage from source 45 the drop out speed is lowered.

Once in overdrive the kickdown switch 55 will not function to drop out of overdrive unless the high vacuum switch 40 is off because the kickdown switch 55 works through the on gate 60.

The logic of the system 10 may be summarized as follows:

1. Overdrive cutin and cutout control:
    A. The transmission will go into overdrive at a predetermined speed (28 mph., e.g.) when the following conditions are met:
        1. The engine load is below a predetermined level $L_1$ as indicated by the intake manifold vacuum being above a low level (e.g. 6 inches of mercury) indicated by the source 20;
        2. The manual selector switch 50 is in its overdrive position; and
        3. The kickdown switch 55 is not depressed (not opened).
    B. The transmission will shift out of overdrive at a predetermined drop out speed, when the following conditions are met:
        1. The throttle is off or set low ("off throttle") at a predetermined low speed. Off throttle will close high vacuum switch 40 and energize transistor Q5 which will lower the reference signal source 45 causing the speed to be very low before the comparator 30 will turn off.
        2. On throttle at a speed less than cutin. With the throttle open the high vacuum switch 40 will be open, transistor Q5 will be off and reference signal source will be normal, allowing the comparator 30 to turn off.
        3. On throttle with either the kickdown switch 55 or the manual selector switch 50 open. On throttle will open the high vacuum switch 40 thus allowing the "OR" gate 65 to de-energize the solenoid 75.
2. Kickdown
    A. The transmission will shift out of overdrive when the kickdown switch 55 is depressed, only if the high vacuum switch is open. This is to prevent the transmission from shifting to a lower ratio at any speed while off throttle. Normally, kickdowns are made at full throttle.
3. Lock-up
    A. The operation of lock-up or manual selector switch 50 is the same as kickdown except that the lock-up switch 50 maintains an open circuit. The transmission will not go into overdrive at anytime that the lock-up switch 50 is open. If in overdrive at the time that the lock-up switch is opened, the transmission will remain in overdrive until the throttle is depressed enough to open the high vacuum switch.

These later features of points 2 and 3 prevent the downshifting of the overdrive transmission until engine load is over a certain level to prevent an undue shock load being placed on the engine and drive system including the overdrive transmission. If desired, the operator may still drop out of overdrive by turning off the manual switch (or maintaining the kickdown switch depressed) and opening the throttle (hitting the gas petal) for a brief period.

For completeness in the disclosure of the above described system but not for purposes of limitation the following representative values and component identifications are submitted. These values and components were employed in a system that was constructed and tested and which provided high quality performance. Those skilled in this art will recognize that many alternative elements and values may be employed in constructing systems and circuits in accordance with the present invention. Indeed, even though the herein set out system and circuit are the presently considered best mode of practicing the invention, the present inventor may himself decide, after further experiments and experience or for differing environments of use, to make modifications and changes from the herein set out values.

| Circuit Element | Type or Value |
| --- | --- |
| Resistors R1, R17, R18, R20 and R21 | 1K Ohms |
| Resistors R2 and R12 | 47K Ohms |
| Resistors R3 and R9 | 2.7K Ohms |
| Resistor R4 | 270 Ohms |
| Resistors R5 | 39K Ohms |
| Resistor R6 | 50K Ohms |

| Component | Value |
|---|---|
| Resistor R7 | 4.7K Ohms |
| Resistors R8, R16, and R22 | 10K Ohms |
| Resistor R13 | 330 Ohms |
| Resistor R14 | 3.3K Ohms |
| Resistors R15 and R25 | 820 Ohms |
| Resistor R19 | 2.2K Ohms |
| Resistor R24 | 27 Ohms |
| Resistor R10 | 330K Ohms |
| Capacitors C1 and C5 | 0.15 mf |
| Capacitor C3 | 0.33 mf |
| Capacitor C4 | 0.22 mf |
| Capacitor C2 | 5 mf |
| Diodes D1-D7 | IN4816 |
| Transistors Q1-Q6 | 2N5172 |
| Transistor Q7 | MPSA55 |
| Transistor Q8 | MP525 |

While efforts have been made to accurately record and transcribe the above set out values it is of course, possible that one or more errors may have inadvertently crept into this compilation. To guard against these, the reader is cautioned to employ the well known methods to mathematically and experimentally verify the above.

It should now be apparent from the above description that an overdrive control system has been provided that provides for better automatic control of entering and leaving overdrive.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. The improvement in an overdrive control system of the type that controls the institution of and drop out of overdrive by a vehicle propelled by an engine, comprising:

means coupled to the vehicle's engine for sensing and producing signals indicative of engine load therefrom;

a source of vehicle speed signals; and control means coupled to said speed signal source and to said sensing means and responsive to said speed signal source and to said engine load signal means for instituting overdrive in response to sensed predetermined vehicle speed and engine load conditions and for dropping out of overdrive at a sensed speed which speed depends upon sensed engine load.

2. In an engine driven motor vehicle having overdrive provisions, the improved overdrive control system, comprising, in combination:

a source of signals representative of the vehicle's speed;

means coupled to the vehicle's engine for sensing engine load and for producing signals representative of different load conditions; and control means, coupled to said source and said means, for automatically causing the institution of overdrive in response to speed signals representative of speeds over a particular speed when the load signals represent a load below a particular load, and for automatically dropping out of overdrive for in response to speed signals representative of differing vehicle speeds when said engine load signal producing means produces signals that are representative of differing engine loads, whereby when the engine load is low, said vehicle is maintained in overdrive until a lesser speed than otherwise.

3. The overdrive control system as defined in claim 2, wherein:

said system includes manually operable switch means (50, 55) coupled to the control means for causing said control means to cause drop out of overdrive in direct response thereto under some sensed and signaled load and speed conditions, but not under other such conditions.

4. The overdrive control system as defined in claim 2, wherein:

said engine load and signal producing means comprises a first (20) and a second (40) engine load signal source which respectively produce output signals indicative of sensed loads under and above the particular load and a predetermined different load, and said control means is responsive to said speed signal source (15) and to said first engine load signal source for causing the vehicle institute overdrive and also includes means to latchably maintain the vehicle in overdrive despite a change in the output of said first load signal source (20).

5. The overdrive control system as defined in claim 2, wherein:

said engine load and signal producing means comprises a first (20) and a second (40) engine load signal source which respectively produce output signals indicative of sensed loads under and above the particular load and a predetermined different load; and said control means includes means (145) responsive to the output signals of said second load signal source (40) for the maintaining of the vehicle in overdrive for speed signals representative of a range of speeds below the speed which the control means would otherwise have caused the vehicle to drop out of overdrive.

6. An overdrive control system for an engine driven vehicle comprising:

a source (15) of electric signals representative of vehicle speed;

a first source (20) of engine load electric signals which first load signal source produces an output signal for loads under a predetermined intermediate level;

a second source (40) of engine load electric signals which second load signal source produces an output signal for loads under a preselected low level;

a source of reference electric signals (45);

an overdrive control unit (75) responsive to an input command signal (71) to cause the vehicle to institute overdrive or drop out of overdrive according to the presence or absence of that overdrive command signal;

a solid state comparator (30) having a first and a second input and an output, which comparator compares its first input to its second input and produces an output signal when the first input reaches a predetermined relation to its second input;

means (70) for producing the overdrive command signal in response to both said comparator output signal and a second signal (66);

means (140, 141, 65) for producing said second signal in response to certain predetermined conditions including the presence of said second load signal and said overdrive command signal;

means (145) for coupling selectively one or another of said reference signals from said reference signal source to the second input of said comparator in response to the absence or presence of both said second load signal and said overdrive command signal;

gate means (25) for selectively coupling or not coupling the speed signal from said speed signal source to the first input of said comparator in response to the presence or absence of both said first load signal and said overdrive command signal; and means interconnecting said above set out elements whereby said vehicle is caused to enter overdrive at one speed and may drop out of overdrive at one of a plurality of speeds, depending upon sensed engine load.

7. The overdrive control system of claim 6 wherein:

said speed signal source (15) produces a d.c. signal whose amplitude varies as a function of sensed speed;

said first engine load signal source (20) is an intake manifold vacuum switch which is operated at a first vacuum level;

said second engine load signal source (40) is an intake manifold vacuum switch which is operated at a second vacuum level which is a higher vacuum level than said first level;

said source of reference signals produces d.c. voltage level signals of a first and a second level;

said comparator (30) is of the solid state flip-flop type;

said overdrive command signal producing means is a solid state power amplifier;

an overdrive indicator light (85) is driven from said overdrive command signal producing means; and said gate means (25) is a solid state amplifying device.

8. In an engine driven motor vehicle:

an overdrive transmission (76) coupled between the engine and the vehicle's driving elements;

a solenoid (75) controllably coupled to said overdrive transmission to cause said overdrive transmission to change drive ratios;

a source (15) of signals representative of the vehicle's speed coupled to the vehicle for sensing its speed;

means (20, 40) coupled to the vehicle's engine for sensing engine load and for producing signals representative of different load conditions; and control means (25, 45, 140 etc.), coupled to said source, said load sensing means, and said solenoid for automatically causing said solenoid to change the drive ratio of said overdrive transmission in response to speed signals representative of speeds over a particular speed when the load signals represent a load below a particular load, and for automatically dropping out of overdrive in response to speed signals representative of differing vehicle speeds when said engine load signal producing means produces signals that are representative of differing engine loads.

* * * * *